(No Model)
W. W. MELLOR & J. SHAW.
VESSEL FOR THE CONVEYANCE OF MILK.
No. 502,005. Patented July 25, 1893.
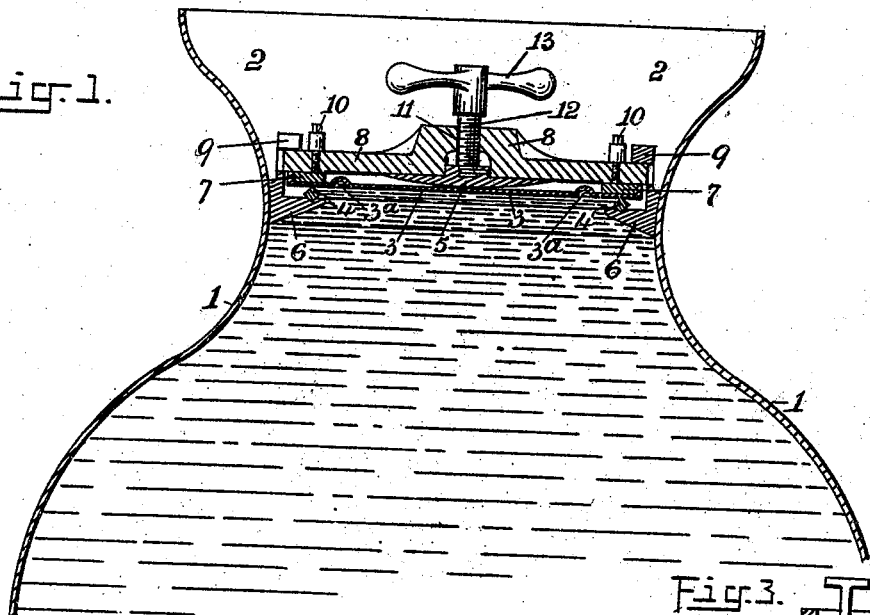
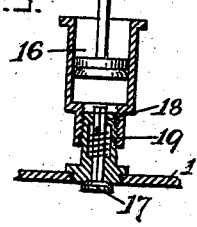
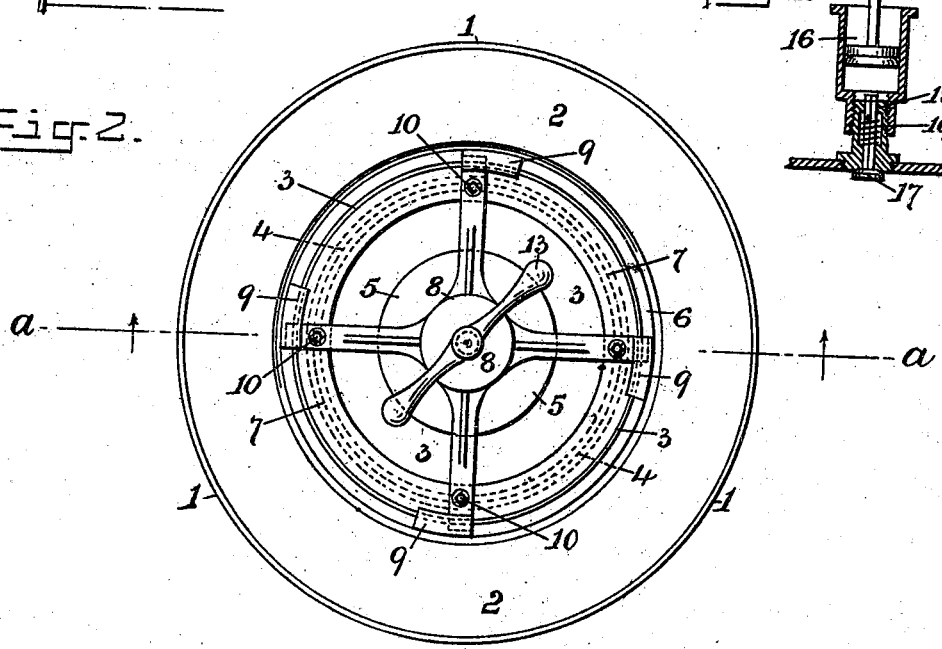
WITNESSES:
Chas J. Gooch
John Cullin
INVENTORS:
William W. Mellor and
Joseph Shaw
by Herbert W. T. Jenner
Attorney.

UNITED STATES PATENT OFFICE.

WILLIAM W. MELLOR, OF SEACOMBE, AND JOSEPH SHAW, OF HUDDERSFIELD, ENGLAND.

VESSEL FOR THE CONVEYANCE OF MILK.

SPECIFICATION forming part of Letters Patent No. 502,005, dated July 25, 1893.

Application filed January 10, 1893. Serial No. 458,191. (No model.)

*To all whom it may concern:*

Be it known that we, WILLIAM WOOD MELLOR, residing at Seacombe, in the county of Chester, and JOSEPH SHAW, residing at Huddersfield, in the county of York, England, both subjects of the Queen of Great Britain, have invented certain new and useful Improvements in Cans or Vessels for the Conveyance of Milk; and we do hereby declare the following to be a full, clear, and exact description of the invention, such as will enable others skilled in the art to which it appertains to make and use the same.

Our invention relates to vessels or cans for the conveyance of milk by road, rail or sea; and it consists in the novel construction and combination of the parts hereinafter fully described and claimed.

Referring to the drawings:—Figure 1 is a vertical section of the upper portion of a can or vessel for the conveyance of milk and the cover or lid and adjacent parts, taken on line *a*, *a*, of Fig. 2. Fig. 2 is plan of same. Fig. 3 is a sectional detail of back pressure valve added to the milk can and a force pump for forcing a further supply of milk into the vessel when sealed, to accumulate a pressure therein greater than that accumulated by the lid or cover, as would be necessary for conveying the milk under hydrostatic pressure exceptionally long distances.

In the accompanying drawings, 1 is the can or vessel in the mouth 2 of which is adapted to be placed a thin flexible metal diaphragm cover or lid 3 which rests upon a compression ring 4 composed of india rubber, leather, or other suitable pliable material and made to the section shown, its lower edge fitting into a V shaped groove in a shoulder or seating 6 formed on or secured to the interior walls of the mouth of the vessel. The diaphragm cover 3 is flanged or turned up at its outer edge to receive a metal ring or washer 7 upon which rests a center or bridge piece 8 capable of being turned around or partly rotated thereon to engage the extremities of its radial arms with lugs 9 on the upper edges of the shoulder 6 and thus secure the diaphragm cover in position as shown, to seal the vessel. Between the bridge piece 8 and the cover or lid 3 is placed a convex plate 5 to which is secured one end of a screw 12 adapted to work through a nut or internally threaded opening 11 in the center of the bridge piece, and having a handle 13 by which to operate it.

10 are set screws passing through the arms of the bridge piece and engaging the metal ring 7 against which they are screwed to force down the diaphragm cover 3 and compress the ring 4 so that it shall make a fluid tight joint between the shoulder or seating and the cover or lid. The cover or lid is indented or corrugated at 3ª to strengthen it.

The bridge piece, cover or lid and adjacent parts are taken out to enable the milk to be poured into the can which is filled to the level of the ring 4. The cover 3 is then placed back onto the ring 4, and the bridge piece placed over it and turned partly around to engage the ends of its radial arms with the lugs or locking devices 9, so as to secure the cover in the mouth of the vessel. Afterward the set screws 10 are screwed down by a key and force the cover 3 against the ring 4 so as to compress it and make the joint between the cover and the vessel fluid tight. The milk in the vessel is thus confined and placed under hydrostatic pressure which prevents agitation during transit, but it is desirable to accumulate pressure in the vessel in excess of what is absolutely necessary in order to compensate for any reduction in bulk of the milk which may take place by reason of variation or lowering of the temperature of the milk with that of the atmosphere and this is accomplished by giving the screw 12 a few turns which forces the convex plate 5 downward and causes the diaphragm cover or lid 3 to be bent or curved inwardly to the segment of an arc, by which means hydrostatic pressure is accumulated in the vessel.

We find in practice that a hydrostatic pressure of twenty pounds is ordinarily as much as is necessary to keep the milk in good condition and allow for reduction in bulk which may arise by the lowering of the temperature of the atmosphere, without destroying the hydrostatic pressure needful to maintain the molecules of the fluid in equilibrium or at rest, but the pressure may be greater or less as suits individual requirements and according to the distance the milk has to be conveyed. To accumulate greater hydrostatic pressure in the vessel than is possible with the construction of lid or cover described, we employ an ordinary force pump 16 (see Fig. 3) and, after sealing the vessel and setting up hydrostatic pressure therein, we further force a small additional supply of milk past the back pressure valve 17 into the vessel. The pump 16 is screwed onto a nozzle 18 secured in any part of the vessel 1 and having a back pressure valve adapted to work therein, the latter being held against its seating by a spiral spring 19 confined between a stud on the valve spindle and a shoulder in the nozzle. The force pump however would only be required when sending the milk an exceedingly long distance requiring a pressure in excess of what is set up by the lid or cover to preserve the fluid, and the cans would therefore require to be of stouter build to withstand this pressure. To these stronger cans alone it is necessary to secure the nozzles and valves.

What we claim is—

The combination, with the can having in its neck a seat, and lugs 9 above the seat; of a removable bridge-piece adapted to engage with the said lugs, a diaphragm cover provided with a stiffening ring at its periphery, a packing ring interposed between the said seat and cover, screws engaging with the said bridge-piece and operating to press the cover onto the packing ring, and a central screw engaging with the said bridge-piece and adapted to force the said cover downward, whereby the contents of the can are subjected to hydrostatic pressure, substantially as set forth.

In testimony whereof we hereunto affix our signatures in presence of two witnesses.

WILLIAM W. MELLOR.
JOSEPH SHAW.

Witnesses:
GEORGE B. NALDER,
THOMAS H. BARRON,
*Market Place, Huddersfield.*